United States Patent [19]

Boze

[11] Patent Number: 4,668,405

[45] Date of Patent: May 26, 1987

[54] DOWNFLOW FILTER WITH HIGH VELOCITY BACKFLUSH

[75] Inventor: Ronald A. Boze, Covington, La.

[73] Assignee: Process Development, Inc., Kenner, La.

[21] Appl. No.: 746,628

[22] Filed: Jun. 19, 1985

[51] Int. Cl.$^4$ .............................................. B01D 23/12
[52] U.S. Cl. .................................... 210/795; 210/274; 210/278
[58] Field of Search ............... 210/795, 791, 792, 793, 210/794, 796, 797, 798, 274, 278

[56] References Cited

U.S. PATENT DOCUMENTS

3,554,377  1/1971  Miller .................................. 210/275

Primary Examiner—Frank Sever
Attorney, Agent, or Firm—Keaty & Keaty

[57] ABSTRACT

A method and apparatus for backflushing downflow filters is disclosed which comprises providing a closed container having contiguous, vertically adjacent filter layers. A layer of gravel is provided below the filter layers and is separated from the bottom filter layer by a foraminous gravel retention member. Fluid under pressure is introduced through a plurality of fluid nozzles into the gravel layer to backflush the filter layers. Backflush fluid in introduced at a sufficient flow rate to fluidize all of the filter layers to segregate them in accordance with their specific densities and particle size. Introducing the backflush fluid into a gravel layer through a plurality of nozzles helps prevent development of localized areas of high fluid velocity that can cause intermingling of the filter layers during backflush.

29 Claims, 13 Drawing Figures

DOWNFLOW FILTER WITH HIGH VELOCITY BACKFLUSH

BACKGROUND OF THE INVENTION

1. Field of the Invention

This invention concerns downflow filters, and more particularly concerns methods of backflushing multiple filter media layers in downflow filters to segregate the layers and enhance effectiveness of the filter.

2. General Discussion of the Background of the Invention

Downflow filters originally employed a single filter bed comprised of sand. Use of a single layer was a drawback, however, because sand consists of a variety of different grain sizes. The grain size distribution resulted in a stratification of granules during backwash. More specifically, during the backwashing step the filter beds expanded and the lighter, smaller particles tended to rise to the top of the bed and the heavier, larger materials tended to gravitate to the bottom. The single layer of sand thereby tended to stratify with the finest filter particles in the top of the filter and the coarsest filter particles in the bottom. This stratification created a condition in which the finest particles on top were subject to "surface plugging" which rapidly decreased the effectiveness of the filter.

This problem was overcome in the prior art by the provision of dual media filters. These filters typically consist of a top layer of anthracite and a bottom layer of sand, the anthracite being lighter and larger than the sand, and the sand consisting generally of the same size particles as used in the mono-bed filters described above. The top anthracite layer presents a more open and porous surface to the influent, thereby allowing coarser particles to penetrate the surface. After backflushing, the smaller, heavier sand particles tend to remain at the bottom of the filter because their specific gravity is greater than that of anthracite.

In spite of the advantages of the multi-media filters, they still present some serious problems. For example, backflushing tends to intermingle the particles of the respective layers of the filter. This intermingling is brought about by the fact that a layer of caked contaminants forms over the top portion of each of the respective beds. During backflushing, pressure builds up below the layer of contaminants and the caked contaminants initially break in a few places instead of breaking uniformly across the layer of the bed. As these initial breaks in the caked layer occur, particles of the medium underneath the caked layer jet up into the media above.

Another cause of intermingling among the layers is that lateral distributor pipes are usually employed at the bottom of the filter. These lateral distributors are comprised of a central header running across a diameter of the tank adjacent the bottom of the tank, with perforated secondary distributor pipes transverse to the central header. Backwash fluid under pressure is introduced into the central header and thence into the lateral distributors whence it moves through the perforations in the lateral distributors to fluidize some of the filter layers. These lateral distributors, however, tend to unevenly distribute fluid under pressure into the beds during backflushing, thereby creating a churning effect and very effectively intermingling the layers to defeat the purpose of backwashing.

The churning effect caused by lateral distributors can be slightly diminished by using a plurality of nozzles across a horizontal cross section of the filter tank. Even then, however, the nozzles tend to develop local areas of high velocity that move particles between layers.

Since it is critical to the proper performance of the downflow filter that the distinct layers of media remain well stratified, the problems of the prior art have created a serious and expensive problem for users of downflow filters. It has become the accepted practice in the field to remove the filter media from the filter container and replace it with new, stratified layers. This is a costly and time consuming procedure that may be necessary as frequently as two to three times a year.

It is accordingly an object of this invention to provide a method of backwashing multiple media downflow filters to restratify the media without removing them from the vessel.

It is another object of the invention to introduce backwash fluid under pressure into the filter media without creating areas of local high velocity within the media.

SUMMARY OF THE INVENTION

The aforementioned objects are achieved by providing a closed container having at least top and bottom discrete, horizontal filter media layers contained therein. The container is provided with a backwash outlet above the filter media layers and a backwash inlet below the filter layers.

A layer of gravel is provided beneath the bottom filter layer, the layer of gravel being separated from the bottom filter layer by a foraminous gravel retention member. Fluid under pressure is introduced into the gravel through a plurality of fluid nozzles that discharge the fluid in a direction parallel to the filter layers. The nozzles are distributed evenly across a plate that supports the gravel layer, thereby helping achieve a uniform flow across a horizontal cross section of the filter tank. Introducing the fluid into the gravel helps assure an even flow of backwash fluid by breaking up the flow of fluid as it moves around the many particles of gravel towards the filter layers. The gravel layer helps prevent development of local areas of high fluid velocity that defeat the purpose of backwashing.

Backwash fluid under pressure is introduced through the fluid nozzles at incremental velocities. The fluid is initially introduced at a first velocity which fluidizes only the top filter layer. Flow volume is then increased until each of the layers in the filter are in turn fluidized. Once fluidization of all the filter layers is achieved, the layers will segregate in accordance with the specific gravity and effective size of the particles which comprise each layer. The flow volume of the backwash fluid is then decreased until the bottom layer is no longer fluidized and settles back to the bottom of the filter. The flow volume is progressively reduced in stepwise fashion until each of the layers settle to their respective positions within the filter.

In other embodiments of the invention, the differences in particle size and specific gravity between the respective layers can permit particles in some of the upper layers to reach capture velocity. For example, in a three layer filter, backwash fluid is introduced at a first velocity which only fluidizes the top filter layer. The fluid velocity is then increased to a second velocity which fluidizes only the middle filter layer and causes the top layer to reach capture velocity, thereby compacting it tightly against the top of the container. Finally, the fluid velocity is increased to a third velocity which imparts capture velocity to the top and perhaps middle filter layers while fluidizing only the bottom layer. Fluid velocity can then be incrementally decreased to reverse the steps. For example, the fluid velocity is first reduced to the second velocity so that the bottom layer settles back to the bottom while the middle layer remains fluidized and the top layer is tightly compacted against the top of the container. Fluid velocity is then decreased to the first velocity so that the middle layer settles on top of the bottom layer and the top layer is only fluidized. Introduction of fluid through the nozzles is then discontinued all together, at which time the top layer settles on top of the middle layer, and all three layrs have been segregated so that they will most effectively filter a liquid passing through them.

Whether or not any of the layers reach capture velocity, it is important that at least all of the layers be fluidized by introducing the backwash fluid in such a way that local areas of high velocity are not created. The present invention achieves this goal by providing a plurality of nozzles that horizontally introduce the backwash fluid into the layer of gravel.

DETAILED DESCRIPTION OF THE PREFERRED EMBODIMENT

The following detailed description of the preferred embodiment is being made in accordance with the requirement of law that the best mode of practicing the invention be described in such detail that anyone skilled in the art would be enabled to make and use the invention. The following detailed description is not intended in any way to limit the scope of the invention.

Figure 1:
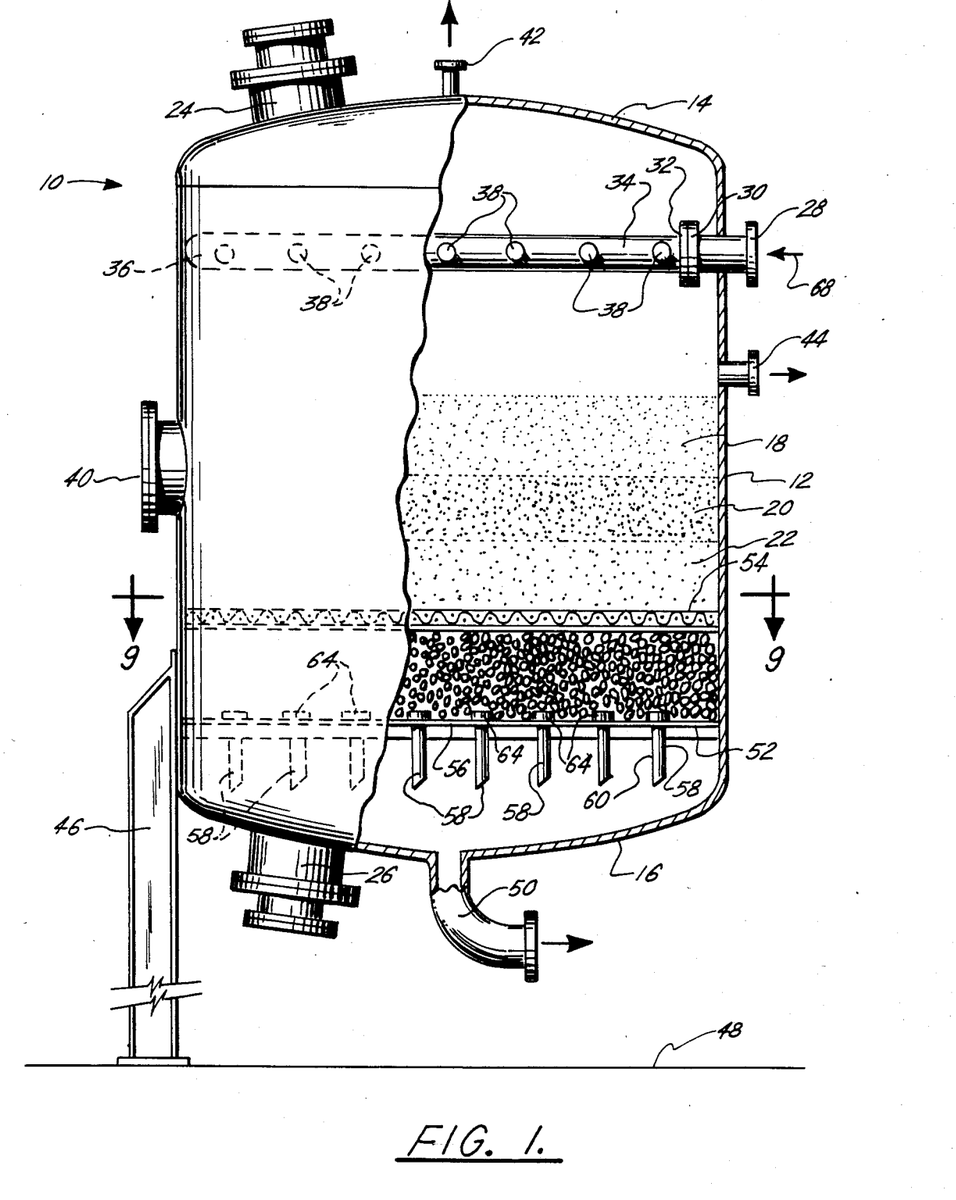
FIG. 1 is a side elevational view of a filter tank constructed in accordance with the present invention, portions of the front wall of the filter tank being broken away to reveal, in cross section, the interior of the tank.

A downflow filter 10 is shown in FIG. 1 to be comprised of a container having a cylindrical body 12, a closed, domed top 14, and closed bottom 16. Filter 10 is provided with a top filter layer 18, middle filter layer 20 and bottom filter layer 22 contained within filter 10. Top filter layer 18 is contiguous and immediately vertically adjacent middle filter layer 20, and middle filter layer 20 is contiguous and immediately vertically adjacent bottom filter layer 22.

In the disclosed embodiment, top filter layer 18 is comprised of a twelve inch deep layer of anthracite having a specific gravity of about 1.6 and an effective diameter of about 1.0 mm. Middle filter layer 20 is comprised of a twelve inch deep layer of particles of garnet having a specific gravity of about 4.2 and and an effective diameter of about 0.4 mm. Bottom filter layer 22 is comprised of a twelve inch deep layer of garnet having a specific gravity of about 4.2 and an effective diameter of about 2.0 mm.

Container body 12 has a first opening 24 above the filter layer and a second opening 26 below the filter layers. First opening 24 comprises a backflush outlet, while second opening 26 serves as a backflush inlet.

Downflow filter 10 is provided with a downflow inlet 28 through which fluid to be filtered is introduced into filter 10. Inlet 28 terminates in a flanged portion 30 which mates with a flanged portion 32 of a central header 34 that projects across a diameter of cylindrical body 12. Header 34 has a closed end 36, and a plurality of lateral headers 38 that project perpendicularly from central header 34. Each of headers 38 is in fluid communication with central header 34 and are perforated so that water introduced through inlet 28 can be evenly distributed across a horizontal cross section of tank 10 by passing through central header 34 and lateral headers 38.

An inspection/access port 40 is provided through the side of cylindrical body 12 about half way from the bottom to the top of body 12. Vent 42 fluidly communicates with the interior of tank 10 through the apex of domed top 14 for removing excess fluids such as air from the interior of filter 10. Drain 44 fluidly communicates with the interior of cylindrical body 12 through a side wall of body 12 at a point above the top of layer 18. A support beam 46 can be employed to support filter 10 in spaced relationship to the ground 48, thereby providing space for an outlet 50 through bottom 16.

Figure 10:
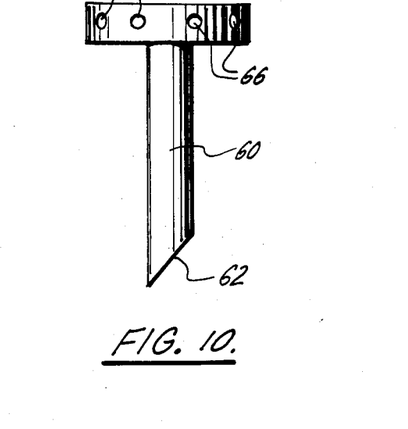
FIG. 10 is an enlarged, side elevational view of the nozzles through which backflush fluid is introduced into a layer of gravel.

A gravel layer 52, which is about twelve inches thick, is provided beneath bottom layer 20, the layer of gravel being comprised of one quarter inch by one half inch particles of gravel. Gravel layer 52 is separated from bottom filter layer 22 by a foraminous gravel retention member 54 which is in the nature of a screen or perforated plate. Gravel layer 52 is supported from underneath by a perforated plate 56, and a fluid nozzle 58 is inserted through each perforation in plate 56. Each nozzle 58 is comprised of a cylinder 60 (FIG. 10) having a tapered bottom 62 and a cylindrical head 64. Eight orifices 66 are disposed equidistantly around the periphery of head 64 so that water moving into cylinder 60 passes into head 64 and is thence projected radially horizontally outwardly around head 64 through orifices 66. Backwash fluid under pressure is introduced into gravel layer 52 through fluid nozzles 58 in a manner described below. Plate 56 is provided, in preferred embodiments, with at least 5.2 nozzles per square foot across the perforated plate 56 to ensure uniformity of backwash velocities across the horizontal cross section of tank 10.

Figures 2, 5:
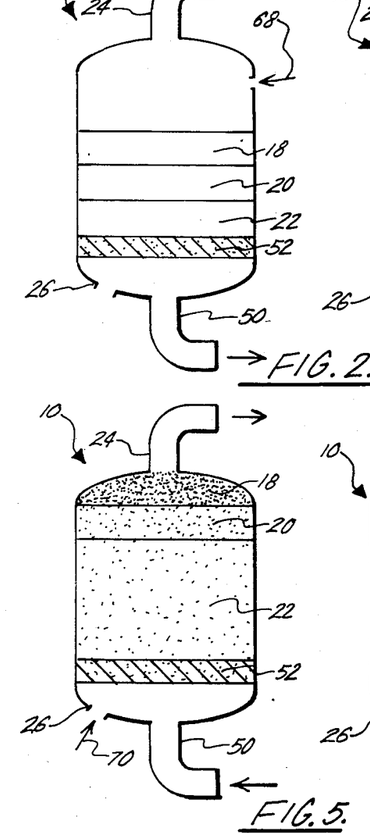
FIG. 2 is a schematic side view of the tank shown in FIG. 1, the horizontal filter layers being shown in their compacted, downflow filtering orientation. Although the filter layers are shown to be segregated in the schematic diagram it should be understood that they are in fact intermingled.
FIG. 5 is a schematic view similar to FIG. 4 wherein backflush fluid velocity has been further increased to impart capture velocity to both of the top layers while only fluidizing the bottom filter layer.

In operation, tank 10 functions as a downflow filter in a manner shown in FIG. 2 of the drawings. Fluid to be filtered enters inlet 28 at the arrow designated 68 in FIG. 2, and the fluid then progressively flows downwardly through layers 18, 20 and 22. Since layer 18 is comprised of anthracite having an effective diameter of 1.0 mm and layer 20 has an effective diameter of 0.4 mm, finer particulates will pass through layer 18 and into layer 20. This arrangement of layers avoids surface plugging at the top of layer 18 which would occur if layer 18 were compised of finer particles than layer 20.

It is customary for filter 10 to be backflushed at low velocities so as to fluidize at least layers 18 and 20 of filter 10. These backflushing procedures are carried out, for example, by introducing about 10 gallons per minute per square foot of water into tank 10 from beneath layer 22. Such periodic backflushing is necessary to help cleanse the layers once they become clogged with impurities. The backflushing, however, has the drawback of tending to intermingle the layers and greatly decrease the efficiency of the filter. This intermingling is caused by the development of local areas of high backflush velocity that jet portions of lower filter layers into the higher filter layers and also cause particles from higher layers to move into the lower layers.

Once the intermingling of the layers has occurred, it has been customary for the operator of the filter to remove the intermingled layers and replace them with new, segregated layers. The present invention avoids the necessity of removing and replacing the layers by instead introducing backwash fluid under much higher velocities than have previously been used in the art.

Figures 3, 4:
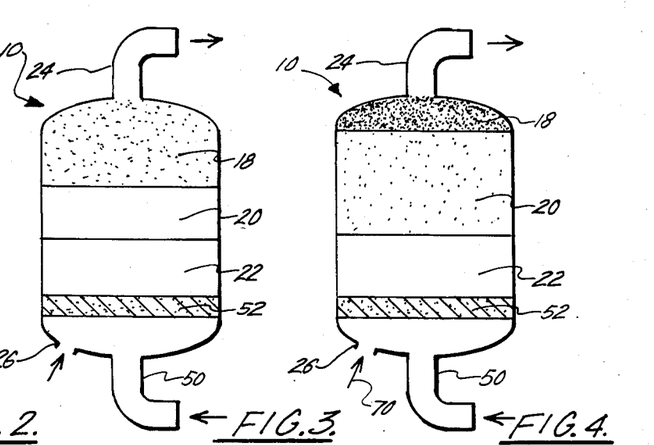
FIG. 3 is a schematic view similar to FIG. 2 showing the initiation of backflushing of the downflow filter in accordance with the present invention.
FIG. 4 is a schematic view similar to FIG. 3 wherein the velocity of the backflushing fluid has been increased and the particles of the top filter layer have reached capture velocity and compacted it against the top of the filter vessel, while the middle layer has become fluidized and the bottom layer is beginning to expand.

The first step in segregating the layers is shown in FIG. 3, wherein fluid (for example water at 46° F.) is introduced through opening 26 at arrow 70 in FIG. 3. A valve in outlet 50 is closed so that fluid introduced through opening 26 cannot escape from the bottom of tank 10. The water under pressure is then forced through nozzles 58 and out of orifices 66 in heads 64. As the water emerges from orifices 66, it is propelled radially outwardly from each head 64. The water then moves through the small crevices between the particles of gravel in layer 52 to more evenly distribute the flowing water across the horizontal cross section of tank 10 and break up any areas of local high velocity. The flowing water then moves up through layers 22, 20 and 18 in that order. The backflush fluid then exits through opening 24.

Backflush fluid is first introduced at such a velocity that layer 18 is fluidized (as shown in FIG. 3) while layers 20 and 22 only slightly expand, if at all. The velocity of the backflush fluid is then rapidly increased until the anthracite particles of layer 18 reach capture velocity and compact in a tight layer against the top of the container, while layer 20 fluidizes as shown in FIG. 4. When this step occurs, layer 22 may expand slightly over the degree of expansion shown in FIG. 3.

The next step is to again quickly increase the velocity of the backflush fluid so that capture velocity is imparted to layer 20. When the particles of layer 20 reach their capture velocity, they are held tightly against the layer 18 almost as if they were a solid layer. The diameters and densities of the particles in layers 20 and 22 are chosen in at least this embodiment such that when layer 22 fluidizes in the fashion shown in FIG. 5, layer 20 will reach capture velocity.

Once the bottom layer 22 in FIG. 5 has been fluidized, high velocity backflushing can continue for 10 to 15 minutes. Once the bottom layer is fluidized, any particles contained therein that have moved there from a higher layer are now free to move back to the higher level they originally came from. The velocity of the backflush fluid can then be rapidly decreased so that bottom layer 22 begins to settle on top of gravel layer 52 in the manner shown in FIG. 6. Middle layer 20 remains fluidized while top layer 18 continues to be tightly packed against the top of tank 10. The condition of the layers shown in FIG. 6 is usually achieved by rapidly reducing the velocity of the backflush fluid to the same velocity that was being employed in FIG. 4.

Figures 6, 7:
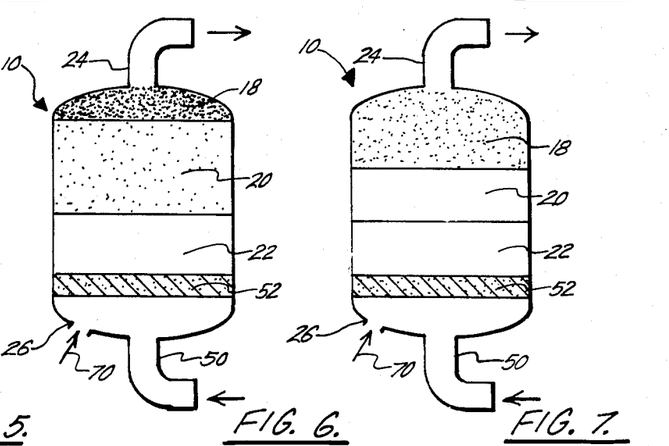
FIG. 6 is a view similar to FIG. 5 wherein fluid velocity has been decreased back to the velocity shown in FIG. 4 so that the bottom layer begins to fall back down to its original position above the gravel layer while the middle layer is merely fluidized and the top layer remains compacted against the top of the container.
FIG. 7 is a view similar to FIG. 6 wherein backwash fluid velocity has been further decreased so that the middle and bottom layers settle against the bottom of the tank while the top layer remains fluidized in the upper portion of the tank.
Figure 8:
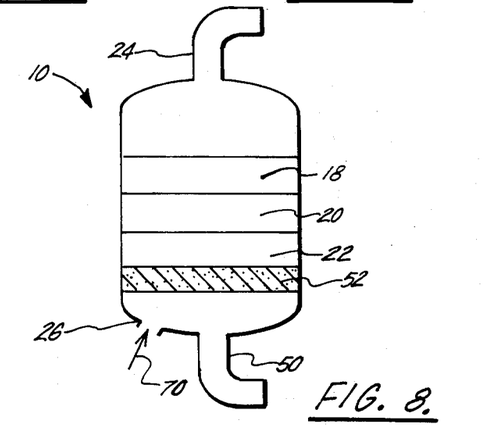
FIG. 8 shows the next step in the process after that shown in FIG. 7, wherein backwash fluid is no longer being introduced and the layers of the tank have segregated and settled back to the bottom of the tank.
Figure 9:
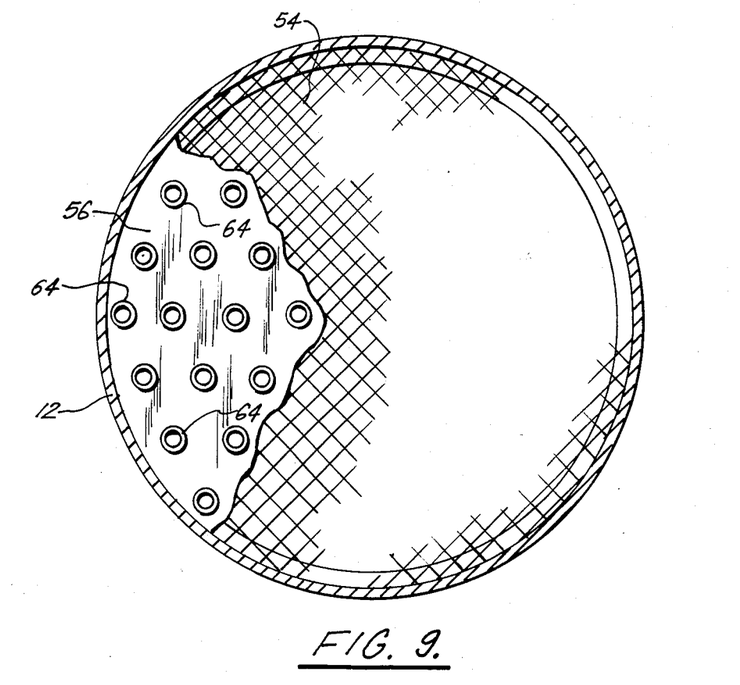
FIG. 9 is a cross sectional view taken along section line 9—9 of FIG. 1.

The velocity of the backflush fluid is then further rapidly decreased so that the layers attain the condition shown in FIG. 7. Specifically, layer 20 begins to settle on top of layer 22, while layer 18 remains fluidized. The backwash velocity employed to achieve the condition of the layers shown in FIG. 7 is substantially the same as was used in connection with the discussion of FIG. 3.

The velocity of the backflush fluid is then further decreased below the fluidization velocity of top layer 18, so that layer 18 then settles back on top of layer 20.

The result of the aforementioned procedure is that all of the layers have been backflushed and resegregated so that the filter can continue to operate efficiently.

The foregoing method can be modified by only fluidizing layer 20 instead of imparting capture velocity to it. For example, backwash water can be introduced into the tank to achieve the orientation shown in FIG. 3. Backwash flow is then increased to fluidize layer 20 and allow layer 18 to reach capture velocity. Flow volume can then be incremented sufficiently to fluidize layer 22 while maintaining layer 20 in a highly fluidized state with layer 18 compacted against the top of the container. The benefits of the present invention can be achieved as long as all of the layers at least fluidize. Once fluidization is achieved, any particles that do not belong within a layer are then free to migrate to their appropriate layer and settle back to the bottom in a segregated layer. The only requirement of the method is that all media layers be fluidized in such a manner that local areas of high velocity are avoided.

It should be understood that the same technique could be employed in separating the layers of a dual-layer downflow filter. For example, if layer 22 were eliminated, it would be necessary to perform only those steps of the aforementioned backflushing operation which are schematically illustrated in FIGS. 3, 4, 7 and 8. The technique could also be used with more than three filter layers.

To achieve fluidization without developing local areas of high velocity, it is important that the backflushing fluid be evenly distributed under pressure across a horizontal cross section of tank 10. If areas of local high velocity are permitted to develop, particles in the respective layers will intermingle, thereby defeating the purpose of the invention. The use a large number of distribution nozzles to introduce fluid into a gravel layer which further subdivides and distributes the pressurized fluid are important aspects of the invention that permit backflushing to proceed without developing local areas of high velocity.

During backflushing, it will be desireable to cover central header 34 and lateral header 38 with a well screen to prevent particles of anthracite and/or garnet from plugging the openings in the headers. Similarly, it will be necessary to interpose a screen between first opening 24 and the interior of tank 10 to prevent layers 18 and 20 from exiting from the tank if layers 18 and 20 reach their capture velocity. Preferred embodiments of such a strainer screen would be a spherical, triangular or conical screen.

The following examples provide specific embodiments of the invention and are intended by way of example to illustrate how the method of the present invention can be employed. It is known that viscosity of water decreases as its temperature increases, so examples are given at varying temperatures.

EXAMPLE I

This Examples uses layers 18, 20 and 22 as described in the foregoing detailed description. Layer 18 has an effective diameter of 1.0 mm and a specific gravity of 1.6. Layer 20 has an effective diameter of 0.4 mm and a specific gravity of 4.2. Layer 22 has an effective diameter of 2.0 mm and a specific gravity of 4.2.

As the backwash flow is started, water at 46° F. is employed. The anthracite will begin to fluidize, and when the backwash flow is increased to 11 gpm/sq.ft., the anthracite layer 18 expands 27% and the layer of garnet 20 expands 10%. Layer 22 has not expanded at all. This is the correct state of fluidization during routine backwashing. However, with most downflow filters, repeated backwashings at this rate, in conjunction with varying pressure loads due to dirt plugging, will ultimately result in the media becoming mixed and the filter performance ruined.

Backwash flow is then increased to aproximately 18 gpm/sq.ft. at which time layer 18 begins to compact against the top of the filter container and layer 20 achieves approximately 29% expansion.

Backwash flow is then increased to about 45 gpm/sq.ft., at which time layer 18 is tightly compacted against the top of the container and layer 20 is over 80% fluidized. Layer 22 is now about 1% fluidized and particles from layers 18, 20 are now free to leave fluidized layer 22 and migrate to their appropriate layers. Flow volume is now decreased in stepwise fashion to permit layer 22 to settle first on top of gravel layer 52. Flow velocity is next decreased below the velocity for minimum fluidization for layer 20, and it settles on top of layer 22. As flow volume further decreases, it falls below the fluid volume required to attain minimum fluidization of layer 18, which then settles back on top of layer 20. The result is segregated layers which can now be efficiently used to continue downflow filtering.

EXAMPLE II

The viscosity of water varies with temperature, hence required flow rates for completely fluidizng the bed will also vary. The following table illustrates the flow rates at which different stages of fluidization are achieved. Stage A occurs when layer 18 is fluidized and layers 20, 22 are at rest. Stage B occurs when layers 18, 20 are fluidized and layer 22 is at rest. Stage C occurs when layer 18 is compressed against the top of the container and layers 20, 22 are fluidized. The layers 18, 20, 22 are comprised of the materials described in the detailed description.

|   | Flow Rate in gpm/sq. ft. at | | |
|---|---|---|---|
|   | 40° F. | 50° F. | 60° F. |
| A | 6 | 7 | 8 |
| B | 10 | 12 | 12 |
| C | 40 | 50 | 50 |

EXAMPLE III

It is necessary to practice the present invention that all of the layers be at least completely fluidized. The flow rate at which complete fluidization occurs can be predicted using the following equation:

$$G_{mf} = \frac{0.005 \, D_p^2 \, g \, p_f(p_s - p_f) \, \phi_s^2 \, E_{mf}^3}{u \, (1 - E_{mf})}$$

$G_{mf}$ = fluid superificial mass velocity for minimum fluidization lb/(Sec) (Ft$^2$)
$D_p$ = particle diameter (ft.)
g = local acceleration due to gravity (32.2 ft/sec squared)
$p_f$ = fluid density (lb/ft$^3$)
$p_s$ = solid density (lb/ft$^3$)
$0_s$ = particle shape factor (sphericity) which is dimensionless
$E_{mf}$ = voidage of minimum fluidization, dimensionless
u = fluid viscosity At 46° F., fluidization of layer 22 will occur at about 45 gpm/sq.ft.

EXAMPLE IV

Figure 11:
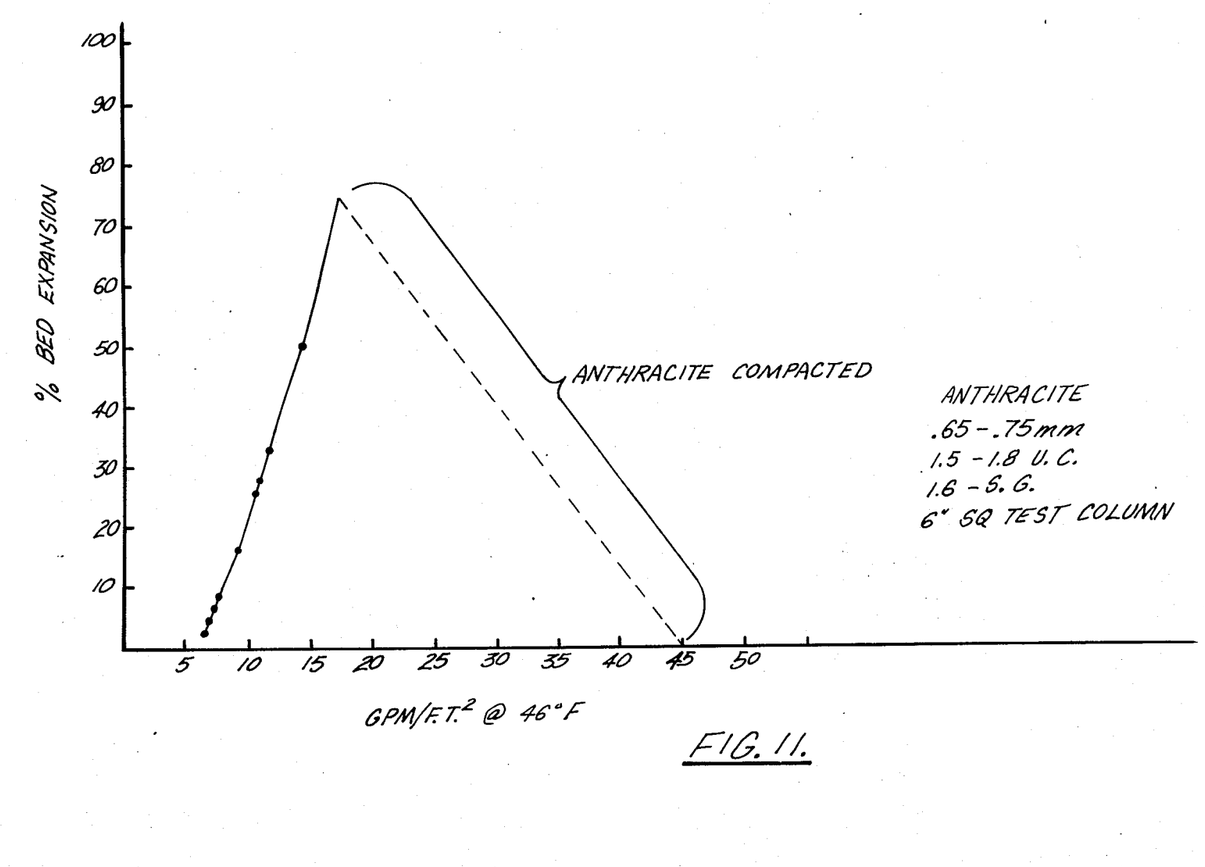
FIG. 11 is a graph demonstrating the percent expansion of a filter layer of anthracite having particle diameters in the range of 0.65–0.75 mm and a specific gravity of 1.6 when backflushing is carried out at 46° F. at varying flow rates.
Figure 12:
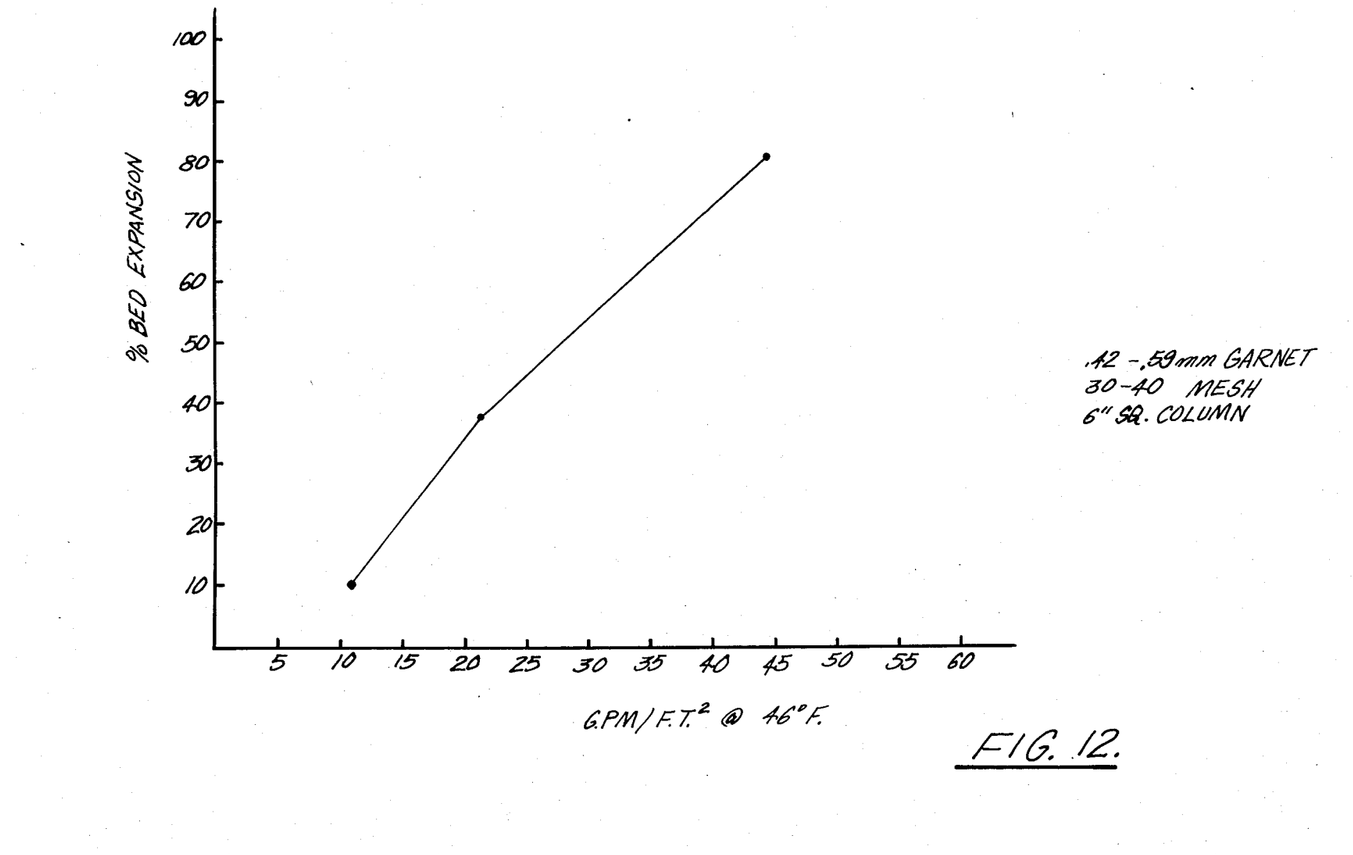
FIG. 12 is a graph demonstrating the percent expansion of a filter layer of garnet having particle diameters in the range of 0.42–0.59 mm and a specific gravity of 4.2 when backflushing is carried out at 46° F. at varying flow rates.
Figure 13:
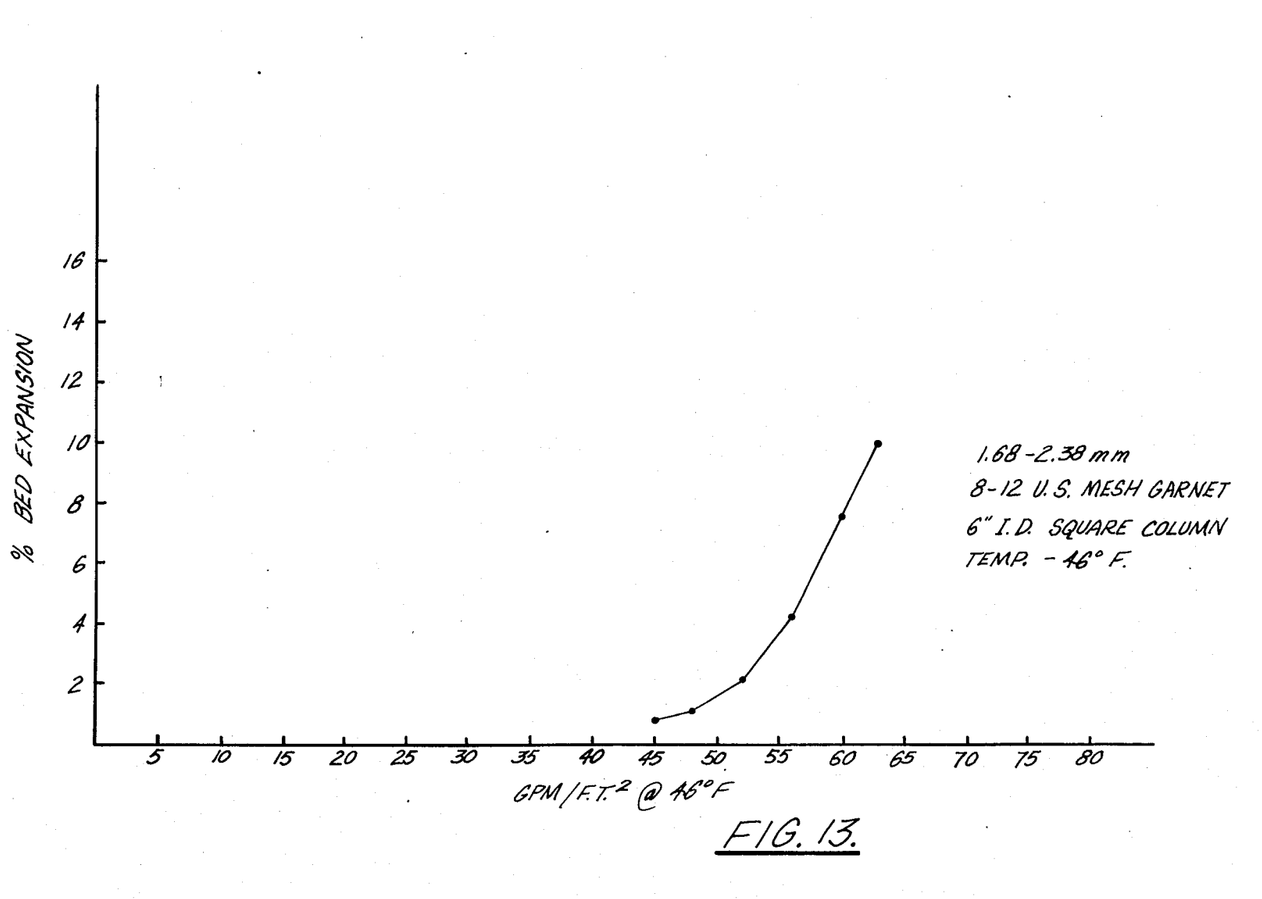
FIG. 13 is a graph demonstrating the percent expansion of a filter layer of garnet having particle diameters in the range of 1.68–2.38 mm and a specific gravity of 4.2 when backflushing is carried out at 46° F. at varying flow rates.

FIGS. 11, 12 and 13 summarize the percent expansion of layers 18, 20, 22 at 46° F. when backflushing is accomplished at varying flow rates. A comparison of the three graphs demonstrates that a flow rate of about 45 gpm/sq.ft at 46° F. will achieve fuidization of the heaviest, coarsest layer 22 while fluidizing layer 20 and compacting layer 18. Flow rates above 45 gpm/sq.ft. will increasingly expand layer 20 until compaction begins to occur when capture velocity of layer 20 is reached.

EXAMPLE V

The procedure of this example can be carried out exactly as in Example I, however, prior to introduction of backwash water an expandable fluid such as air is introduced through nozzle 58 at 6 scfm for 3 to 5 minutes. This preparatory step helps fracture the compacted bed and break the cake accumulated on the top of layer 18.

EXAMPLE VI

To demonstrate the effectiveness of the present method, the layers 18, 20, 22 were removed from the test filter and thoroughly mixed together. The mixed layers were then placed back in the test filter and backwash fluid slowly introduced and increased to about 46 gpm/sq.ft., at which time the segregation and restratification of the layers 18, 20, 22 could be seen. As backwash flow was decreased, the stratified layers of media settled to the bottom of the filter and formed homogenous layers which thereafter could efficiently filter influent.

I claim:

1. A method of backflushing downflow filters having a plurality of filter layers without intermingling the layers, the method comprising the steps of:
   providing a backflushing means for minimizing the creation of areas of local high velocity throughout the entirety of the filter during a backwash cycle thereof, and sufficient to provide in situ restratification of the media therein, the step of providing the backflushing means comprising the steps of:
   providing a closed container having top and bottom contiguous, vertically adjacent filter layers, the layers being comprised of particles which fluidize at different backflush flow rates, the top layer fluidizing at a lower flow rate than the bottom layer;
   introducing backflush fluid under pressure into the filter layers at a sufficient flow rate to flow upwardly and fluidize the bottom layer; and
   providing an inhibition means for inhibiting creation of areas of local high velocity in the layers while the backflush fluid is being introduced.

2. The method of claim 1 wherein the inhibition means comprises a layer of gravel beneath the bottom layer into which the backflush fluid is introduced, the layer of gravel being separated from the bottom layer by a foraminous gravel retention member.

3. The method of claim 2 wherein the layer of gravel is supported by a plate, and the backflush fluid is introduced through a plurality of fluid nozzles provided through the plate and extending into the layer of gravel.

4. The method of claim 3 wherein backflush fluid is introduced into the gravel layer substantially horizontally from the nozzles.

5. The method of claim 4 wherein the backflush fluid is introduced horizontally from each nozzle by providing the nozzle with a cylindrical head through which fluid is introduced into the gravel, the head having a vertical face around its periphery which is provided with orifices through which the fluid is introduced into the gravel layer.

6. The method of claim 5 further comprising the step of providing at least 5.2 nozzles per square foot across the plate supporting the layer of gravel.

7. The method of claim 1 wherein the top filter layer is comprised of anthracite having a specific gravity of 1.6 and an effective diameter of about 1.0 mm, and the bottom filter layer is comprised of garnet having a specific gravity of 4.2 and an effective size in the range of about 0.4–2.0 mm.

8. A method of backflushing downflow filters having a plurality of filter layers without intermingling the layers, the method comprising the steps of:
   providing a backflushing means for minimizing the creation of areas of local high velocity throughout the entirety of the filter during a backwash cycle thereof, and sufficient to provide in situ restratification of the media therein, the step of providing the backflushing means comprising the steps of:
   providing a closed container having top, middle and bottom, contiguous vertically adjacent filter layers, the layers being comprised of particles that fluidize at different backflush flow rates, the top layer fluidizing at a lower flow rate than the middle layer, the middle layer fluidizing at a lower flow rate than the bottom layer;
   introducing backflush fluid under pressure into the filter layers at a sufficient flow rate to flow upwardly and fluidize the bottom layer; and
   providing an inhibition means for inhibiting creation of areas of local high velocity in the layers into which said backflush fluid is being introduced.

9. The method of claim 8 wherein the inhibition means comprises a layer of gravel beneath the bottom layer, the layer of gravel being separated from the bottom layer by a foraminous gravel retention member.

10. The method of claim 8 wherein the backflush fluid is introduced at a sufficient flow rate to impart capture velocity to the particles of the top layer.

11. The method of claim 10 wherein fluid is introduced into the gravel layer substantially horizontally.

12. The method of claim 11 wherein the top layer is comprised of particles which achieve capture velocity at a lower flow rate than the particles of the midde layer, and the bottom layer is comprised of particles which will fluidize at a flow rate which imparts capture velocity to the middle layer, the step of introducing backflush fluid comprising the steps of:
   first introducing backflush fluid at a flow rate sufficient to impart capture velocity to the top layer while only fluidizing the middle layer; and
   then increasing the flow rate of the backflush fluid to impart capture velocity to the particles of the middle layer while fluidizing the bottom layer.

13. The method of claim 12 wherein the backflush fluid is introduced through at least 5.2 nozzles per square foot across the perforated plate.

14. The method of claim 13 wherein the top filter layer is comprised of anthracite having a specific gravity of about 1.6 and an effective diameter of about 1.0 mm, the middle filter layer is comprised of garnet having a specific gravity of about 4.2 and an effective size of about 0.4 mm, and the bottom filter layer is comprised of garnet having a specific gravity of about 4.2 and an effective diameter of about 2.0 mm.

15. A method of backflushing downflow filters having a plurality of filter layrs without intermingling the layers, the method comprising the steps of:
   providing a backflushing means for minimizing the creation of areas of local high velocity throughout the entirety of the filter during a backwash cycle thereof, and sufficient to provide in situ restratification of the media therein, the step of providing the backflushing means comprising the steps of:

providing a closed container having top and bottom discrete, horizontal particulate filter layers contained therein, the filter layers being immediately vertically adjacent one another, the container having a first opening above the filter layers and a second opening below the filter layers;

introducing backflush fluid under pressure through the second opening and into the filter layers at a sufficient flow rate to flow upwardly and out of said first opening to clean the filter layers, the top filter layer being comprised of particles tthat will reach capture velocity at a flow rate that will fluidize the bottom layer, the fluid being introduced at such a velocity that the particles of the top filter layer will reach capture velocity and the bottom filter layer will fluidize, while inhibiting creation of areas of local high velocity within the filter layers.

16. The method of claim 15 wherein the top layer is comprised of anthracite and the bottom layer is comprised of garnet.

17. The method of claim 15 wherein the top filter layer is comprised of larger diameter particles than the bottom filter layers.

18. A method of backflushing downflow filters having a plurality of filter layers without intermingling the layers, the method comprising the steps of:

providing a backflushing means for minimizing the creation of areas of local high velocity throughout the entirety of the filter during a backwash cycle thereof, and sufficient to provide in situ restratification of the media therein, the step of providing the backflushing means comprising the steps of:

providing a closed container having top, middle, and bottom discrete horizontal particulate filter media layers contained therein, the top filter layer being immediately vertically adjacent the middle filter layer without being separated by a filter screen, and the middle filter layer being immediately vertically adjacent the bottom filter layer without being separated by a filter screen, the container having a first opening above the filter layers and a second opening below the filter layers;

providing a layer of gravel beneath the bottom filter layer, the layer of gravel being separated from the bottom filter layer by a foraminous gravel retention member; and introducing backflush fluid under pressure through the second opening at a sufficient flow rate to backflush the filter layers by flowing through the layer of gravel which inhibits creation of local areas of high velocity within the layers during backflushing, the top filter layer being comprised of particles that will reach capture velocity at a fluid velocity that will fluidize the middle filter layer, the middle filter layer being comprised of particles that will reach capture velocity at a fluid velocity that will fluidize the bottom filter layer, wherein the step of introducing the fluid comprises the steps of:

introducing the backflush fluid at a first flow rate which fluidizes only the top filter layer;

then increasing the flow rate of the fluid to a second flow rate which fluidizes the middle filter layer and imparts capture velocity to the particles of the top filter layer without fluidizing the bottom layer;

then increasing the flow rate of the fluid to a third velocity which imparts capture velocity to the particles of the top and middle filter layers while fluidizing the bottom filter layer;

then reducing the flow rate of the fluid to a flow rate which fluidizes the middle filter layer, imparts capture velocity to the particles of the top layer, and is insufficient to fluidize the bottom layer;

then reducing the flow rate to a flow rate which fluidizes only the top layer without fluidizing the middle and bottom layers; and then discontinuing introduction of the backflush fluid.

19. The method of claim 18 wherein the backflush fluid is introduced substantially horizontally into the gravel layer through a plurality of fluid nozzles extending into the gravel layer.

20. The method of claim 18 wherein the top filter layer is comprised of larger diameter particles than the middle layer.

21. A method of backflushing downflow filters having a plurality of filter layers without intermingling the layers, the method comprising the steps of:

providing a backflushing means for minimizing the creation of areas of local high velocity throughout the entirety of the filter during a backwash cycle thereof, and sufficient to provide in situ restratification of the media therein, the step of providing the backflushing means comprising the steps of:

providing a closed container having top, middle and bottom discrete horizontal particulate filter media layers contained therein, the top filter layer being immediately vertically adjacent and touching the middle filter layer, and the middle filter layer being immediately vertically adjacent and touching the bottom filter layer, the container having a first opening above the filter layers and a second opening below the filter layers, the top filter layer being comprised of anthracite particles having a specific gravity of about 1.6 and a effective diameter of about 1.0 mm, the middle filter layer being comprised of garnet particles having a specific gravity of about 4.2 and an effective diameter of about 0.4 mm, and the bottom filter layer being comprised of garnet particles having a specific gravity of about 4.2 and an effective diameter of about 2.0 mm;

providing a layer of gravel beneath the bottom filter layer, the layer of gravel being separated from the bottom filter layer by a foraminous gravel retention member, the gravel layer being suppoted underneath the layer of gravel by a perforated plate, a fluid nozzle being inserted through perforations in the plate, the fluid under pressure being introduced horizontally into the gravel through the fluid nozzles, the plate being provide with at least 5.2 nozzles per square foot across the perforated plate;

introducing backflush fluid under pressure at a first flow rate which fluidizes only the top layer;

increasing the flow rate of the fluid to a second flow rate which fluidizes only the middle layer and imparts capture velocity to the particles of the top layer;

then increasing the flow rate of the fluid to a third flow rate which imparts capture velocity to the particles of the top and middle filter layers while fluidizing the bottom filter layer;

then reducing the flow rate of the fluid to the second flow rate;

then reducing the flow rate to the first flow rate; and then discontinuing introduction of the backflush fluid.

22. An apparatus for cleaning a downflow filter having a plurality of layers without intermingling the layers, the apparatus comprising:

backflushing means for minimizing the creation of areas of local high velocity throughout the entirety of the filter during a backwash cycle thereof, and sufficient to provide in situ restratification of the media therein, the backflushing means comprising:

a closed container having top and bottom contiguous, vertically adjacent filter layers, the layers being comprised of particles which fluidize at different backflush flow rates, the top layer fluidizing at a lower flow rate than the botom layer;

means for introducing a flow of backflush fluid into the closed container and through the filter layers; and inhibiting means for inhibiting creation of areas of local high velocity in the filter layers during introduction of the backflush fluid.

23. The apparatus of claim 22 wherein the inhibiting means comprises a layer of gravel between the second opening and the filter layers.

24. The apparatus of claim 24 further comprising a foraminous gravel retention member over the layer of gravel and below the filter layers.

25. The apparatus of claim 24 wherein the inhibiting means further comprises a plurality of backflush flow introduction nozzles extending into the layer of gravel, the nozzles having introduction means for introducing the backflush fluid into the gravel in a direction parallel to the filter layers.

26. The apparatus of claim 22 wherein the inhibiting means comprises a plurality of backflush flow introduction nozzles below the filter layers, the nozzles having introduction means for introducing the backflush fluid in a direction parallel to the filter layers.

27. The apparatus of claim 22 wherein the top layer is comprised of larger diameter particles than the particles of the lower layer.

28. The apparatus of claim 22 further comprising backflush means for introducing backflush fluid at an initial and a subsequent incremental flow rate, the initial flow rate being sufficient to fluidize the top layer without fluidizing the bottom layer, the subsequent flow rate being sufficient to impart capture velocity to the particles of the top bed and fluidize the bottom bed.

29. The apparatus of claim 22 further comprising an intermediate filter layer, the backflush means further comprising means for introducing backflush fluid at an intermediate flow rate sufficient to impart capture velocity to the particles of the top layer and fluidize the intermediate layer without fluidizing the bottom layer.

* * * * *